May 16, 1967 W. J. CURREN 3,319,458
CHROMATOGRAPHIC APPARATUS FOR MEASURING HYDROGEN COMPONENTS
Filed Feb. 14, 1964
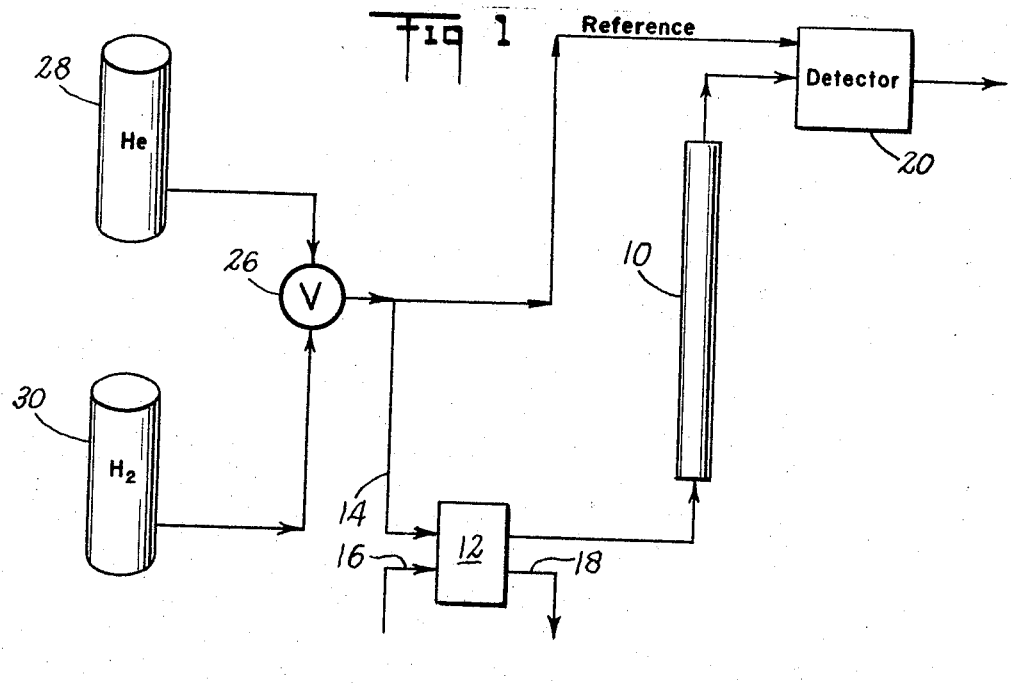
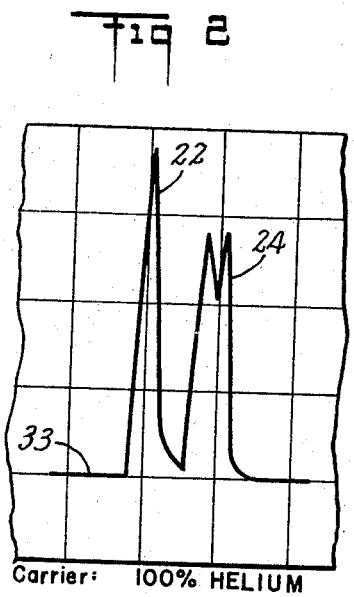
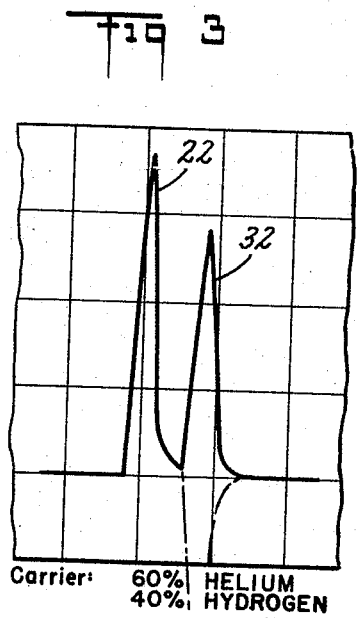
INVENTOR
William J. Curren
BY
Curtis Morris & Safford
ATTORNEYS

United States Patent Office 3,319,458
Patented May 16, 1967

3,319,458
CHROMATOGRAPHIC APPARATUS FOR MEASURING HYDROGEN COMPONENTS
William J. Curren, North Attleboro, Mass., assignor to The Foxboro Company, Foxboro, Mass.
Filed Feb. 14, 1964, Ser. No. 344,994
3 Claims. (Cl. 73—23.1)

This invention relates to chromatography. More in particular, this invention relates to improved chromatographic apparatus for measuring the amount of hydrogen present in a gas sample.

Chromatographic apparatus has been used commercially for a number of years now for the purpose of determining amounts of various components present in a mixture of fluids. Although a variety of equipments and techniques have been in use for this purpose, generally the apparatus has comprised the combination of an adsorptive separation column, means for causing a carrier gas (preferably helium) to flow steadily through the column, a switch for injecting into this carrier gas stream a precisely metered sample containing various components, and a detector (such as a thermal conductivity sensor) responsive to the separated components as they exit in predetermined sequence from the column. The signals from this detector typically are directed to a conventional moving chart recorder to trace pulses the height or area of which is proportional to the amount of the respective component present in the sample. The equipment also advantageously includes means automatically operative to measure the peak height or area of the recorded traces, and to convert this measurement to a meaningful number which can, for example, be printed on a read-out log.

Although such chromatographic equipment has been used successfully to analyze a number of different components, difficulty has been encountered in using it to determine the amount of hydrogen in a sample. Specifically, if the carrier gas is pure helium (as generally preferred for maximum sensitivity) and the detector is a thermal conductivity cell, the detector output signal will produce a "double peaked" trace for hydrogen sample concentrations greater than about 10%. Such an output signal obviously is not suited for analytical purposes, particularly because it is impractical to provide means automatically operative to produce a direct reading of the amount of hydrogen present in the sample, as by the usual peak height or area measuring devices.

Accordingly, it is an object of this invention to provide improved techniques for chromatographically analyzing a gas sample including hydrogen as one of the components to be measured. A more detailed object of this invention is to provide apparatus for producing a single-peaked output signal for hydrogen components of any concentration. Other objects, aspects and advantages of the invention will be pointed out in, or apparent from, the following description considered together with the accompanying drawing, in which:

FIGURE 1 shows diagrammatically a chromatographic system operating in accordance with the present invention;

FIGURE 2 illustrates a recorder chart trace for a hydrogen sample component in the presence of a pure helium carrier gas; and FIGURE 3 illustrates a recorder chart trace for a hydrogen sample component in the presence of a mixed carrier gas containing 40% hydrogen and 60% helium.

As shown in FIGURE 1, the chromatographic apparatus includes a conventional adsorption column 10 which may, for example, comprise a nine foot long stainless steel tubing having a 3/16 inch inner diameter and packed with 90–100 mesh of molecular sieve such as that referred to as type 5A. The input end of this column is connected to a sample switch 12, e.g. of the kind shown in U.S. Patent 3,022,673, issued to D. H. Fuller on Feb. 27, 1962. In the normal position of this switch, carrier gas from a line 14 is connected directly to the column input, while the gas to be analyzed circulates continuously through a separate channel in the switch connecting inlet 16 to outlet 18. At periodic intervals, the switch 12 is actuated to inject into the carrier gas line a predetermined amount of the gas to be analyzed, and this sample is carried through the column 10 by the continued movement of the carrier gas.

In the column 10, the components of the gas sample are selectively adsorbed and released by the internal packing, and thus exit serially from the column output in a sequence determined by the relative characteristics of the components present in the sample. The output of the column is directed to a detector 20, preferably of the thermal conductivity type, e.g. employing hot wires arranged in an electrical bridge network. As each separated component elutes from the column, this detector produces an output signal the magnitude of which corresponds to the amount of the component present in the original gas sample. Typically, this output signal is fed to a conventional moving chart recorder (not shown herein) to produce a corresponding pulse-type trace for each component.

For most components of interest, the detector output signals are single-peaked as well as reasonably uniform and symmetrical, e.g. as indicated as by the recorder trace 22 illustrated in FIGURE 2. However, when the carrier gas is pure helium and the component being sensed is hydrogen at concentrations above about 10%, the detector output signal exhibits a double-peaked configuration as illustrated by the trace 24 in FIGURE 2. As the hydrogen concentration is increased, the valley between the two peaks becomes deeper, until at high concentrations it extends below the base line 33. These characteristics cause serious difficulties in accurately measuring the quantity of hydrogen present. This is particularly the case when it is desired to utilize peak-height or pulse-area sensing devices for providing an automatic read-out of the chromatographic analysis.

In accordance with the present invention, these difficulties are eliminated by using a carrier gas composed of a mixture of approximately 40% hydrogen (by volume) and the remainder helium. As shown in FIGURE 1, the carrier gas line 14 is supplied through a mixing valve 26 from a source of helium 28 and a source of hydrogen 30. It has been found that when the mixing valve 26 is set to provide 40% hydrogen, the detector output signal for a hydrogen component in the gas sample is single-peaked and has a shape similar to the other components being measured. This hydrogen component signal is illustrated by trace 32 in FIGURE 3, alongside a duplication of the trace 22 shown in FIGURE 2. As the hydrogen component in the sample is increased in concentration, the height of the peak is correspondingly increased. Thus, the output signal is suited for use with automatic analytical equipment which measures the peak height or pulse area to produce a signal directly representative of the amount of the component present in the sample.

The detector output signal for a hydrogen component in the presence of this mixed carrier gas actually is opposite in polarity to the output signals for other components, as indicated in phantom on FIGURE 3, and thus the hydrogen trace normally would be in a negative direction. This presents no difficulty, however, since the hydrogen trace is readily made positive, as shown in solid outline in FIGURE 3, merely by reversing the detector lead connection to the recorder during the period the hydrogen output signal is being received.

It was found that consistently good results were obtained with carrier gas mixtures where the amount of hydrogen in the carrier gas was within the range of 37.5% to 42.5%. It was noted, however, that the best results were achieved in the range of 39% to 41% hydrogen in the carrier gas. No satisfactory theoretical explanation for these results has yet been devised.

Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

I claim:

1. Chromatographic apparatus especially adapted for measuring the amount of hydrogen in a gas sample and comprising a separation column arranged to receive the gas sample, a thermal conductivity detector connected to the output of said column to develop signals corresponding to the amounts of the separated components of the gas sample, and carrier gas supply means connected to the input of said column, said supply means including means to apply to said input a mixed carrier gas composed of approximately 40% hydrogen in helium.

2. Chromatographic apparatus especially adapted for measuring the amount of hydrogen in a gas sample and comprising, in combination, a separation column having an input and an output, a carrier gas supply connected to said column input and including means to provide a carrier gas mixture of approximately 40% hydrogen in helium, means to inject into the flow of carrier gas through said column a gas sample containing components the quantities of which are to be measured, and a thermal conductivity detector connected to said column output to produce signals representing the quantities of the separated components.

3. Apparatus as claimed in claim 2, wherein the amount of hydrogen in said carrier gas is within the range of 37.5% to 42.5% by volume.

References Cited by the Examiner

Madison: Analytical Chemistry, vol. 30, No. 11, November 1958, "Analysis of Fixed and Condensable Gases by Two-Stage Gas Chromatography," pp. 1859–1862. Publication Reference No. 22a.

Welti et al.: J. Chromatog., March 1960, "Effect of an Argon-Nitrogen Carrier Gas Mixture on the Sensitivity of a Gas Chromatographic Ionisation Detector," pp. 589–591. Publication reference No. 51.

Hausdorff: "Vapor Fractometry (Gas Chromatography)—A Powerful New Tool In Chemical Analysis," The Perkin-Elmer Corp., September 1955, pp. 1, 20, 21 and 22. Publication Reference No. 6.

RICHARD C. QUEISSER, *Primary Examiner.*

J. FISHER, J. C. GOLDSTEIN, *Assistant Examiners.*